Figures 1, 2:
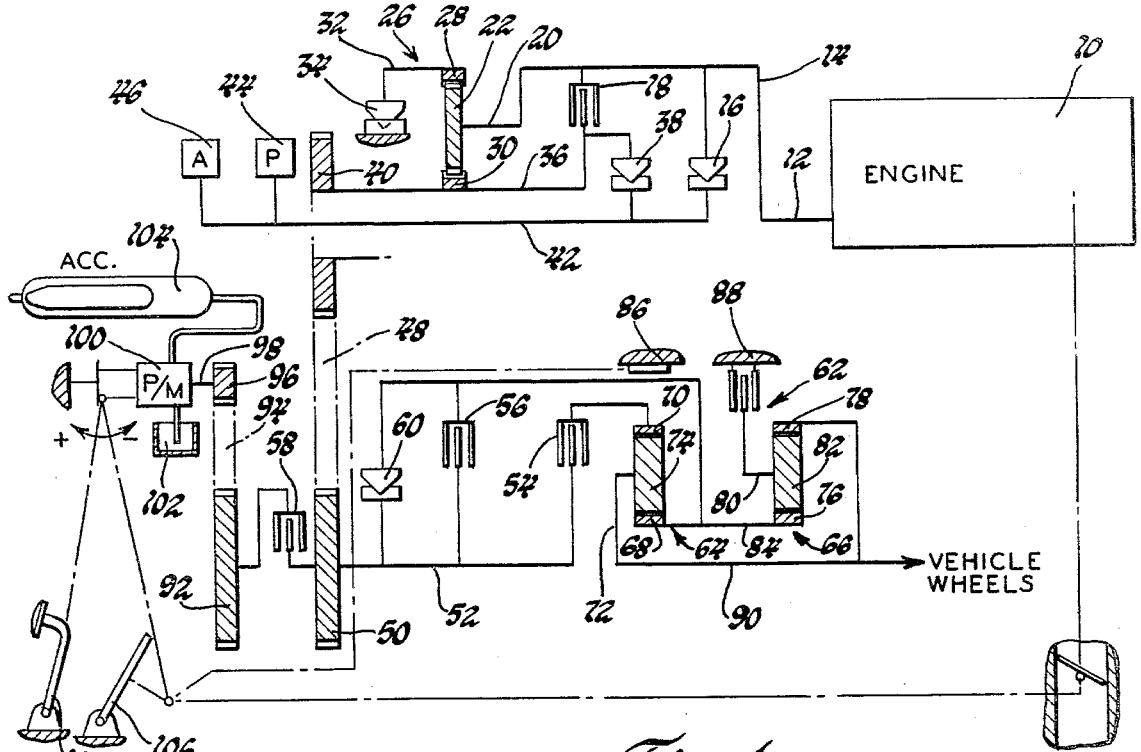

United States Patent [19]

Malik

[11] 4,351,409

[45] Sep. 28, 1982

[54] VEHICLE DRIVE SYSTEM WITH ENERGY STORAGE AND RETRIEVAL

[75] Inventor: Marvin J. Malik, Bloomfield Hills, Mich.

[73] Assignee: General Motors Corporation, Detroit, Mich.

[21] Appl. No.: 206,704

[22] Filed: Nov. 14, 1980

[51] Int. Cl.³ .................. F16H 47/04; B60K 25/00
[52] U.S. Cl. .................................. 180/165; 60/414; 192/0.055
[58] Field of Search ............... 180/165, 65 A, 54 R, 180/308; 60/414, 413, 408; 192/0.055

[56] References Cited

U.S. PATENT DOCUMENTS

| 2,755,898 | 7/1956 | Bell | 60/414 |
| 3,734,222 | 5/1973 | Bardwick | 180/165 |
| 3,910,043 | 10/1975 | Clerk | 180/165 |
| 4,018,052 | 4/1977 | Laussermair | 60/414 |
| 4,110,982 | 9/1978 | Regar | 60/414 |
| 4,242,922 | 1/1981 | Baudoin | 60/413 |
| 4,276,951 | 7/1981 | Smitley | 60/414 |

*Primary Examiner*—David M. Mitchell
*Attorney, Agent, or Firm*—Donald F. Scherer

[57] ABSTRACT

A vehicle drive system has an engine and a multispeed transmission which can be selectively coupled with an energy storage system. The energy storage system includes a hydraulic member which is operable as a pump to store hydraulic fluid under pressure in an accumulator during certain drive system operations and to operate as a motor to use the stored fluid to drive the vehicle through the transmission, to start the engine or both during other drive system operations.

2 Claims, 2 Drawing Figures

| | CLUTCH OR BRAKE | | | | | | | | | |
|---|---|---|---|---|---|---|---|---|---|---|
| | 18 | 58 | 56 | 54 | 88 | 86 | 16 | 38 | 34 | 60 |
| START ENGINE | | X | | X | | | L | | L | |
| NEUTRAL IDLE | | | | X | | | L | | | |
| CHARGE ACCUM. | X | X | | X | | | L | L | | |
| ENGINE 1ST | X | | | X | X | | L | | | |
| ENGINE 2ND | X | | | X | | X | L | L | | |
| ENGINE 3RD | X | | X | X | | | L | L | | |
| HYDRAULIC 1ST | | X | | X | X | | | L | L | |
| HYDRAULIC 2ND | | X | | X | | X | | L | L | |
| HYDRAULIC 3RD | | X | X | X | | | | L | L | |
| REVERSE | X | | X | | X | | L | | | |
| COAST | | | | X | | | | L | L | L |

VEHICLE DRIVE SYSTEM WITH ENERGY STORAGE AND RETRIEVAL

This invention relates to vehicle drive systems and more particularly to such drive systems having capacity for integral energy storage and retrieval.

The present invention is useful in vehicles to provide improved efficiency. The use of the present invention provides a versatile drive system wherein hydraulic energy can be stored during one period of operation and retrieved for use during other periods of operation. The hydraulic system can be pressurized during vehicle braking or by the engine when a vehicle is driving or stationary. The hydraulic system can be utilized to provide driving power to either operate the vehicle or start the vehicle engine or both of these power modes simultaneously.

It is therefore an object of this invention to provide an improved vehicle drive system having an engine-driven multispeed transmission and an energy storage and retrieval system including a hydraulic pump/motor and an accumulator wherein the pump/motor is operative to selectively pump hydraulic fluid at elevated pressures to the accumulator during vehicle coast, engine idle or engine drive, and is alternately operable to selectively accept pressurized fluid from the accumulator thereby operating as a motor to selectively deliver driving power to the multispeed transmission with or without engine power or to deliver starting power to rotate the engine with or without operation of the power transmission.

This and other objects and advantges of the present invention will be more apparent from the following description and drawings in which:

FIG. 1 is a schematic representation of a vehicle drive system utilizing the present invention; and FIG. 2 is a matrix providing graphic illustration of the operable conditions of various components shown in FIG. 1.

Referring to FIG. 1, there is seen a drive system for a vehicle having a conventional internal combustion engine 10 which includes an output shaft 12. The output shaft 12 is drivingly connected through a hub 14 to a one-way clutch 16 and a friction clutch 18. The hub 14 is also connected to a carrier 20 which rotatably supports a plurality of pinion gears, such as 22.

The carrier 20 and pinion gears 22 are components of a planetary gear set 26 which includes a ring gear 28 and a sun gear 30. The ring gear 28 is connected through a hub 32 to a one-way brake 34. The sun gear 30 is secured to a sleeve shaft 36 which is drivingly connected to the friction clutch 18, a one-way clutch 28 and a chain sprocket 40. The one-way clutch 38 and one-way clutch 16 are both connected to a shaft 42 which is drivingly connected to a conventional hydraulic control pump 44 and conventional engine accessories 46.

The sprocket 40 is drivingly connected through a conventional chain 48 to a sprocket 50 which is in turn drivingly connected to a transmission input shaft 52. The transmission input shaft 52 is drivingly connected to three friction clutches 54, 56 and 58, and to a one-way clutch 60. The friction clutches 54 and 58 are preferably spring engaged and pressure released, while friction clutches 56 and 18 are preferably pressure engaged and spring released. As an alternative to fluid pressure engagement or release, the clutches can be controlled electromagnetically, as is well-known.

The friction clutches 54 and 56 and one-way clutch 60 are drivingly connected to a multispeed transmission, generally designated 62. The multispeed transmission 62 includes a pair of planetary gear sets 64 and 66. The planetary gear set 64 has a sun gear 68, a ring gear 70 and a carrier 72 on which is rotatably mounted a plurality of pinion gears 74 which mesh with sun gear 68 and ring gear 70. The planetary gear set 66 has a sun gear 76, a ring gear 78 and a carrier member 80 on which is rotatably mounted a plurality of pinion gears 82 which mesh with sun gear 76 and ring gear 78.

The sun gears 68 and 76 are interconnected by a sleeve shaft 84 which is drivingly connected to friction clutch 56, one-way clutch 60 and a friction brake band 86. The ring gear 70 is drivingly connected to the friction clutch 54. The carrier 80 is operatively connected with a friction brake 88. The carrier 72 and ring gear 78 are both connected to a transmission output shaft 90. The brakes 86 and 88 are preferably fluid-operated, however, other conventional operating means such as electromagnetic or pneumatic may be utilized.

The multispeed transmission 62 will be recognized by those skilled in the art as a threespeed planetary transmission generally utilized in passenger vehicles manufactured in the United States. This multispeed transmission set is normally termed a Simpson gear set in recognition of the inventor. Through selective operation of the clutches and brakes, the transmission 62 will provide three forward speeds and one reverse speed. The one-way clutch 60 will provide a coast drive from the shaft 84 to the transmission shaft 52. Since the clutch 54 is spring engaged and is operable in all forward drive conditions, vehicle coast drive will be transmitted through the planetary sets to transmission input shaft 52 at a direct drive relationship. The operation of the clutches and brakes to provide the three forward speeds and one reverse speed in transmission 62 is illustrated in the matrix of FIG. 2.

The clutch 58 is drivingly connected to a sprocket 92 which is connected by a conventional chain 94 to a sprocket 96. The sprocket 96 is connected to a shaft 98 which is a component in a variable displacement hydraulic translating device 100. The hydraulic translating device 100 is more commonly termed a pump/motor (p/m). As is well-known, p/m units having variable displacement can be utilized to provide various levels of torque absorption or torque delivery depending upon the operation of pump or motor. The p/m 100 is in fluid communication with a hydraulic reservoir 102 and a gas or hydraulic accumulator 104. The clutch 58 can be disengaged during steady state driving to reduce the pumping losses when p/m unit 100 is not being used.

When operating as a pump, the p/m unit 100 will accept hydraulic fluid from reservoir 100 and deliver the fluid under pressure through the accumulator 104. The energy absorbed during pumping will be determined by the displacement of p/m unit 100 and the gas pressure in accumulator 104. It will be appreciated that for p/m unit 100 to operate as a pump, the input shaft 98 will have to be rotated by sprocket 96 through chain 94.

The p/m unit 100 can also act as a motor. When operating as a motor, the p/m unit 100 accepts fluid under pressure from the accumulator 104 and delivers energy to the shaft 98. Energy thus delivered to shaft 98 is transmitted through sprocket 96 to the chain 94. The accumulator 104 can be charged with hydraulic pressure either through engine operation or through vehicle braking operation. When the engine is running and the transmission 62 is in neutral and clutch 18 engaged, engine power is delivered through clutch 18 to sprocket 40 from which it is transmitted by chain 48 to sprocket 50 and therefore clutch 58. With clutch 58 engaged, the power is directed through sprocket 92 and chain 94 from which it is delivered from sprocket 96 to p/m unit 100. With the p/m unit 100 conditioned by the vehicle throttle pedal 106 to operate as a pump, the accumulator 104 will be filled with hydraulic fluid at an elevated pressure. Thus, the accumulator can be charged by engine operation.

When the vehicle is moving and conditioned for braking operation, the transmission input shaft 52 will drive the p/m unit 100 through clutch 58 and sprockets 92 and 96. Clutch 54 and one-way clutch 60 will provide a drive from output shaft 90 to input shaft 52 if the other clutch and brake devices are disengaged. Through operation of the vehicle pedal 108, the displacement of p/m unit 100 can be conditioned to supply fluid from reservoir 102 to accumulator 104 at an elevated pressure. Thus, the accumulator 104 can be charged either by the engine 10 or by the vehicle during braking.

The p/m unit 100 can be utilized to rotate the engine for starting. This is accomplished by conditioning the displacement control of p/m unit 100 to operate as a motor such that the energy of the fluid stored in accumulator 104 is utilized to rotate sprocket 96 and therefore sprocket 92. The rotation of sprocket 92 is transmitted through clutch 56, which is spring engaged, and sprockets 50 and 40. Sprocket 40 rotates sun gear 30 and through planetary gear set 26 urges ring gear 28 to rotate in a reverse direction. One-way brake 34 prevents rotation of ring gear 28 in this direction so that carrier 20 is rotated forwardly at a reduced speed. Rotation of carrier 20 is transmitted to the output shaft 12 which rotates the engine for starting. By manipulation of the vehicle throttle pedal 106, the engine is supplied with air and fuel and if the ignition system is turned on, the engine will start. Thus, the p/m unit 100 can be utilized.

The p/m unit 100 can also be utilized to drive the vehicle through the multispeed transmission 62. When the p/m unit 100 is operated as a motor and the clutches and brakes of transmission 62 are operated as shown in FIG. 2, the vehicle will receive its driving power from the p/m unit 100. The pressure level in accumulator 104 can be utilized to signal the engine that engine power is required. Thus, during vehicle operation at a predetermined pressure level in the accumulator 104, the engine 10 can be started to provide vehicle operation in place of the p/m unit 100. Upon engine starting, the engine output shaft 12 will increase in speed until the speed thereof is equal to the speed of sleeve shaft 36. At this time, clutch 18 will be engaged. This engagement is controlled to occur at synchronous speed thereby preventing slipping engagement.

When reverse drive is desired, the operator selects the reverse mode on a conventional transmission control. Such selection is a signal for the engine to be started. Engine start is accomplished by the p/m unit 100. When the engine is running, clutch 54 is disengaged by pressure generated by pump 44 while clutch 56 and brake 88 are applied. As seen in the matrix of FIG. 2, this conditions the transmission for reverse. If the pressure in accumulator 104 is sufficient to drive the vehicle, the engine will remain at idle. If the accumulator pressure is low or if increased torque is required, clutch 18 will be engaged and the engine output will be added to the system.

The accessory drives are preferably operated only when the vehicle is in motion since when the vehicle is stationary, the engine is off and it is not desirable to utilize the energy stored in accumulator 104 to operate the accessories. If for some reason the accessories must operate when the vehicle is stationary, the engine 10 can be started to provide the necessary operating power. It is preferable to start the vehicle under normal acceleration conditions with the transmission 62 in the second ratio. Thus, during normal accelerations, the brake 86 is controlled in response to movement of the vehicle throttle pedal 106. However, should more acceleration be desired or a grade is to be negotiated, brake 86 can be disengaged and brake 88 engaged thereby conditioning the transmission for first gear operation. Since the clutch 54 is spring engaged, it is not necessary to supply power to operate this unit and as will be noticed in FIG. 2, clutch 54 is engaged only during reverse operation. As previously mentioned, during reverse operation, engine 10 is operating such that hydraulic power from pump 44 will be available to disengage clutch 54.

The embodiments of the invention in which an exclusive property or privilege is claimed are defined as follows:

1. A drive system having a power transmission and an energy storage mechanism for use with a self-propelled engine driven vehicle comprising:
   a multispeed planetary transmission mechanism including an input shaft, an output shaft, planetary gear means operatively connected between said input and output shaft, and a plurality of selectively engageable and disengageable friction clutch and brake means for establishing a drive connection with said input shaft and various drive ratios within said planetary gear means;
   an internal combustion engine having an output shaft;
   gear reduction means drivingly connected between said internal combustion engine output shaft and said transmission mechanism input shaft including one-way brake means for establishing a reduced gear ratio through said reduction gear means when torque is directed from said transmission input shaft to said internal combustion engine output shaft and a selectively engageable friction clutch means for providing a direct drive bypassing the gear reduction means;
   hydraulic supply means including first and second one-way clutch means for providing a one-way drive connection from said engine output shaft and to said hydraulic supply means and from said transmission input shaft to said hydraulic supply means respectively; and
   hydraulic drive and storage means for selectively storing and delivering energy including a variable displacement hydraulic translating means, a storage accumulator means, and a selectively engageable friction clutch means for selectively connecting said hydraulic translating means with said transmission input shaft in parallel drive relationship with said internal combustion engine output shaft, said hydraulic translating means being selectively operable as a hydraulic pump to store hydraulic energy in said accumulator during vehicle coasting and during internal combustion engine operation and also being selectively operable as a hydraulic motor to deliver energy from said accumulator means to said transmission mechanism during acceleration and normal driving of said vehicle and also being operable to supply energy through said gear reduction means to provide automatic starting of the internal combustion engine during any mode of vehicle operation.

2. A drive system having a power transmission and an energy storage mechanism for use with a self-propelled engine driven vehicle comprising:

a multispeed planetary transmission mechanism including an input shaft, a output shaft, planetary gear means operatively connected between said input and output shaft, and a plurality of selectively engageable and disengageable friction clutch and brake means for establishing a drive connection with said input shaft and various drive ratios within said planetary gear means;

an internal combustion engine having an output shaft;

planetary gear reduction means including a sun gear, ring gear and planet carrier drivingly connected between said internal combustion engine output shaft and said transmission mechanism input shaft including one-way brake means for establishing said ring gear as a reaction to provide a reduced gear ratio through said planetary gear reduction means when torque is directed from said transmission input shaft to said internal combustion engine output shaft and a selectively engageable friction clutch means for providing a direct drive bypassing the gear reduction means;

hydraulic supply means including first and second one-way clutch means for providing a one-way drive connection from said engine output shaft to said hydraulic supply means and from said transmission input shaft to said hydraulic supply means respectively;

and hydraulic drive and storage means for selectively storing and delivering energy including a variable displacement pump/motor means, a hydraulic accumulator means, and a selectively engageable friction clutch means for selectively connecting said pump/motor means with said transmission input shaft in parallel drive relationship with said internal combustion engine output shaft, said pump/motor means being selectively operable as a hydraulic pump to store hydraulic energy in said accumulator during vehicle coasting and during internal combustion engine operation and also being selectively operable as a hydraulic motor to deliver energy from said accumulator means to said transmission mechanism during acceleration and normal driving of said vehicle and also being operable to supply energy through said gear reduction means to provide automatic starting of the internal combustion engine during any mode of vehicle operation.

* * * * *